Feb. 26, 1963     J. KOZAK ETAL     3,078,695
APPARATUS FOR EXTRUDING GLASS
Filed April 23, 1958
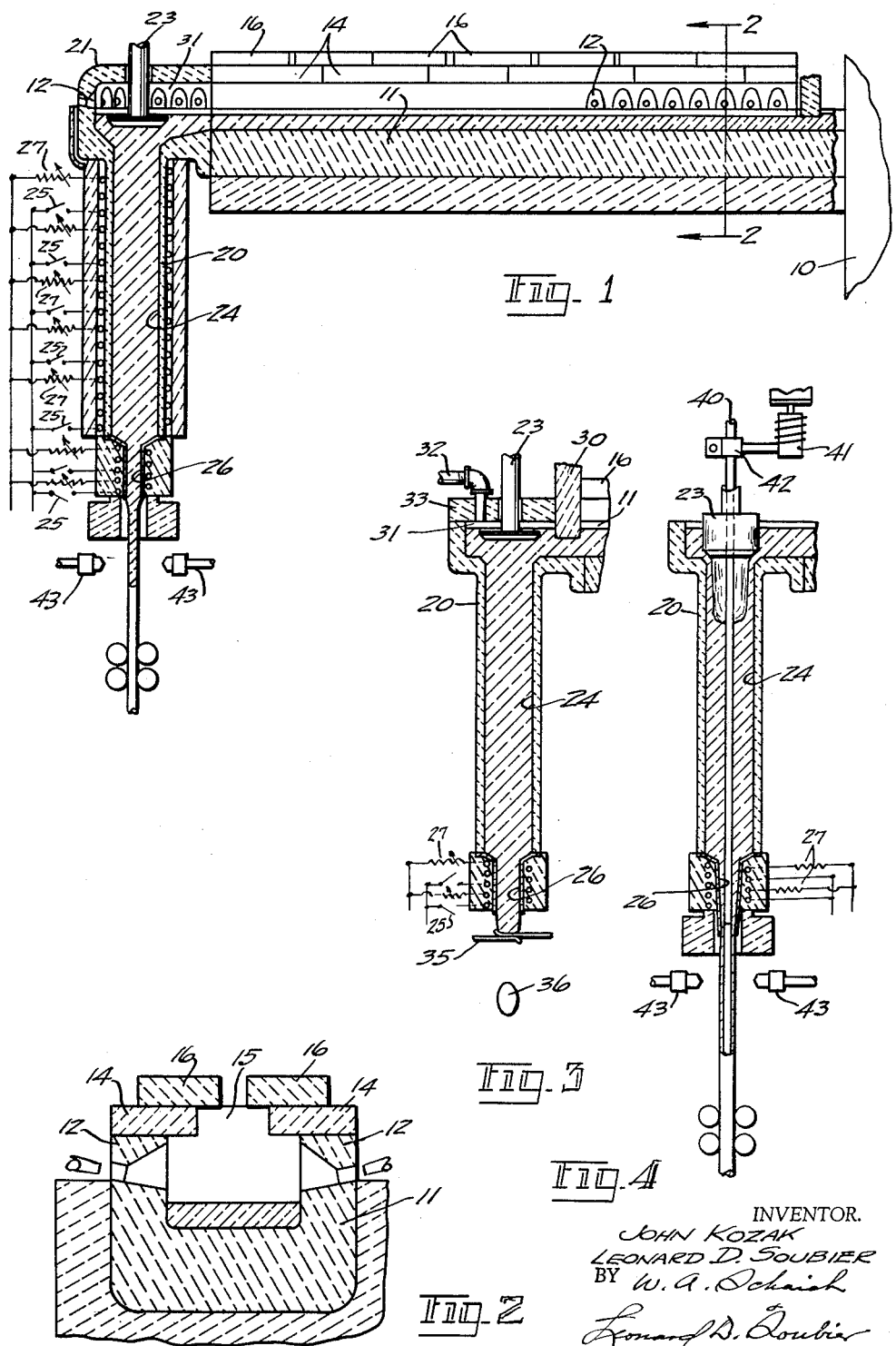
INVENTOR.
JOHN KOZAK
LEONARD D. SOUBIER
BY W. A. Schaich
Leonard D. Soubier
ATTORNEYS

United States Patent Office 3,078,695
Patented Feb. 26, 1963

3,078,695
APPARATUS FOR EXTRUDING GLASS
John Kozak and Leonard D. Soubier, Toledo, Ohio, assignors to Kimble Glass Company, a corporation of Ohio
Filed Apr. 23, 1958, Ser. No. 730,314
2 Claims. (Cl. 65—183)

This present invention relates to a glass feeding device adapted for feeding molten glass from a melting tank to a delivery point and then feeding the glass either in shaped measured portions or in shaped lineal lengths of either hollow or solid formation.

The invention contemplates the provision of a conveying channel for the molten glass, said channel being of unusually small cross-sectional area and having a length from the melting tank to the point of glass discharge which is of sufficient extension to permit the obtaining of a working temperature in the glass by the time the molten glass reaches the discharge orifice. It is to be understood, of course, that the temperature of the molten glass as delivered from the refining portion of the melting tank is considerably higher than that temperature at which glass is normally worked or shaped. Consequently, it is necessary to decrease this temperature to a working temperature and to provide a control which will maintain the working temperature constant.

The small cross-sectional area of the glass conveying channel provides a condition whereby through the application of heat along the length of the channel, there will be provided a condition, wherein a temperature rise or drop in the body of glass may be obtained with great rapidity, thus permitting easy maintenance of a constant glass working temperature.

The glass flowing through this channel will be funneled to a vertically disposed cylindrical chamber of comparatively small diameter and having a height many times greater than the said diameter. This arrangement will provide a column of glass over a discharge orifice and the static pressure head generated by this column of glass will control the passage of the molten glass through the orifice.

It is contemplated that a means be provided over the entrance to this column of molten glass which will be capable of controlling the flow or volume of glass discharged to the column in some proportion to the volume of discharge of glass through the orifice at the bottom of the column. In this manner some measure of control of the pressure head will be obtainable.

The orifice at the bottom of this vertical chamber may be comprised of a material adapted for either resistance or induction heating and in circumferential zones extending through the length or height of this orifice bushing. In this manner a close temperature control can be obtained and maintained at the orifice.

It is also contemplated that the walls of the vertically disposed chamber and the column of molten glass therein will likewise be heated through circumferential zones extending through the height of the column and adapted for independent electrical energizing or other heating in order that a temperature gradient may be established through the height of the column of glass.

The issuance of the glass from the orifice in the bottom of the vertical chamber may be in the form of gobs or in some tubular or even sheet formation. If the issuance is in the form of a tube or rod, it may be then rapidly chilled to a stable dimension and in such instances the glass may then be subjected to restraining rolls or other mechanisms which will obviate the forces of gravity to some controlled extent, thereby permitting the pressure head over the orifice to be the controlling factor in the rate at which the glass will issue from the orifice.

If the glass issuing from the orifice is in hollow tubular form, then a hollow tubular mandrel will be extended down through the orifice to provide air to the tubing to prevent any tendency toward flattening or collapsing. In addition, this mandrel will be vibrated in one or more directions but preferably in the direction of the extrusion and at speeds in excess of the vertical movement of the glass through the orifice. Such vibration when utilized in collaboration with the orifice member and with a controlled viscosity of the glass, will provide dimensional control for the issuing glass tube.

Among the objects of this present invention a primary object is, of course, the provision of an apparatus whereby temperature control of the molten glass may be obtained and maintained with great rapidity and ease.

A further object is the provision of a method and apparatus whereby molten glass may be extruded from an orifice under constant pressure.

Another object is the provision of a method and means whereby molten glass may be extruded from an orifice under pressure in such manner that both its internal and external dimensions may be obtained and maintained.

Further objects will be apparent from the following disclosures.

In the drawings:

FIG. 1 is a sectional elevation illustrating the glass conveying channel and the pressure generating column;

FIG. 2 is a cross-sectional view taken at line 2—2 on FIG. 1 illustrating the reduced dimensions of the body of molten glass and the means for controlling the temperature thereof;

FIG. 3 is a sectional elevation showing a modification wherein the vertical column of glass is atmospherically isolated from the main glass conveying channel and wherein a pressure in addition to the static head pressure is supplied to and over the column; and FIG. 4 is a further modification wherein a vibratory mandrel is supplied to work in cooperation with the orifice to provide dimensional control in the making of extruded tubing.

Referring to the drawings and in particular to FIG. 1, 10 is the refining end of a melting tank to which is attached a glass conveying channel 11 having a series of burners 12 positioned along both sides of its total length, said burners being of a well known type which are adapted to utilize reflected heat along the length of the channel to maintain the glass along the edges thereof at desired temperatures. Roof blocks 14 are positioned along the length of the channel in such manner as to provide an opening 15 therebetween extending through the length of the channel. Additional roof blocks 16 are also positioned along the length of the roof and adapted for movement toward and from each other and the center line of the channel in order to provide control of the open area of the roof opening 15. For example, some of these blocks 16 may be in actual physical edge contact to close off portions of the opening 15 whereas others may be slightly spaced to provide exit for excess heat. Any desired combination of positioning of the blocks 16 may be obtained for temperature control.

Positioned at the outer end of the channel 11 is a nose block 20 which may be generally cylindrical in shape and which is of extended height, said height being many times greater than the diametrical dimensions of the nose block. A roof 21 is provided over this nose block 20 and burners 12 may be used along the upper edges thereof and below the roof for temperature control. A control plunger 23 is positioned over the opening or chamber 24 of the nose block 20, in alignment therewith, and may be adjusted vertically to control the rate of flow of molten glass from channel 11 into the opening 24 of the nose block 20. In this manner the total height of the column of glass in the nose block 20 may be regulated as desired. For example, the head of glass in the nose block 20 may be a completely full static head as illustrated in FIGS. 1 and 3 or the level of the head may be dropped to any desired point as indicated in FIG. 4.

In order to control the temperature of the column of glass in the opening or chamber 24 of the nose block 20, a series of electrical heating units are provided along the vertical height of the column, with each unit adapted to be cut in or out of operation by means of a switch 25 individual to each unit. With this arrangement all of the units may be in operation or any combination thereof may be energized as any particular situation may demand. For example, every other unit along the height of the nose block 20 and the orifice bushing 26 may be energized and in this manner a temperature gradient through the height of the column may be established and maintained. In addition, variable resistors 27 may be utilized in order to control the usable energy in any one of the separate units, thereby to aid in the establishing and maintenance of a temperature gradient through the height of the glass in the chamber 24.

The adjustable plug 23 for controlling the height of the column of glass in the chamber 24 may also be adapted for rotation in the usual manner in order to further insure the homogeneity of the glass entering into the column 24.

With particular reference to the modification in FIG. 3, a damper block 30 is provided between channel 11 and the nose block 20. This block 30 is utilized primarily to segregate the nose block chamber 31 from the channel 11. An inlet pipe 32 is provided in the roof 33 of the chamber 31 through which a gaseous medium, inert to molten glass, may be provided under constant pressure to thereby increase the pressure head of the glass over the orifice 26. In this manner the glass may be subjected to extrusion pressures greatly in excess of that generated by the normal static head pressure of a column of glass.

In such a device the glass will issue from the orifice under increased pressure as well as at an increased rate of speed and shears 35 positioned beneath the orifice may be operated in rapid sequence to sever charges of molten glass 36 therefrom in rapid continuity.

A further modification as shown in FIG. 4 illustrates the provision of a tube 40 extending down through the column of glass in the chamber 24 to a position in close proximity to the end of the orifice bushing 26 or if desired, it may extend into and beyond said orifice. A vibrator 41 is attached to the upper end of this tube 40, as at 42, and is energized to vibrate the tube 40, in a vertical or other direction, so that the glass issuing in the channel formed between the outer wall of this tube and the inner walls of the orifice bushing 26 will be subjected not only to this vibration but also to the cooling action of the tube wall contact to thereby provide control of the internal dimensions of the tube as it issues from the orifice. In addition to this, cooling nozzles 43 are provided which are adapted to impinge cooling air upon the external surface areas of the tube as it issues from the orifice 26 to thereby maintain the dimensions of the tube as it issues.

Other modifications may be resorted to within the spirit and scope of the appended claims.

We claim:

1. Apparatus for extruding a uniform stream of molten glass through an outlet orifice comprising, in combination, a refractory forehearth containing molten glass extending to a point of use, a hollow vertically-disposed chamber having vertical and horizontal internal dimensions containing molten glass disposed at the forward terminating end of said forehearth extending a substantial distance beneath the surface level of the glass in said forehearth, the vertical depth of said chamber being greatly in excess of its horizontal dimensions and substantially greater than the depth of said forehearth, a skimmer element disposed between said forehearth and said chamber isolating the open space over the glass therein, a bushing arranged at the lower region of said chamber having at least one outwardly-opening discharge orifice therein, a heating element associated with said bushing adjacent said discharge orifice, a control plunger disposed within an upper region of said chamber, means supplying an essentially constant pneumatic pressure to an upper portion of said molten glass within said chamber to control its uniform issuance from said discharge orifice, and shaping means disposed externally of said chamber adjacent said discharge orifice to shape said issuing glass into final form.

2. Apparatus as defined in claim 1 including additional heating means disposed above said bushing and associated with and in heating relation to said vertical chamber.

References Cited in the file of this patent

UNITED STATES PATENTS

| | | |
|---|---|---|
| 1,663,093 | Peiler | Mar. 20, 1928 |
| 1,739,519 | Peiler | Dec. 17, 1929 |
| 1,809,794 | Stenhouse | June 9, 1931 |
| 1,853,843 | Bates et al. | Apr. 12, 1932 |
| 2,100,760 | Wadsworth | Nov. 30, 1937 |
| 2,186,718 | Ferguson | Jan. 9, 1940 |
| 2,198,742 | Salskov-Iversen | Apr. 30, 1940 |
| 2,433,116 | Greenbowe et al. | Dec. 23, 1947 |
| 2,734,240 | Southern | Feb. 14, 1956 |
| 2,837,790 | Rozian | June 10, 1958 |
| 2,913,509 | Pinotti | Nov. 17, 1959 |